(No Model.)
C. B. DEAN.
CAR MOVER.
No. 375,443. Patented Dec. 27, 1887.
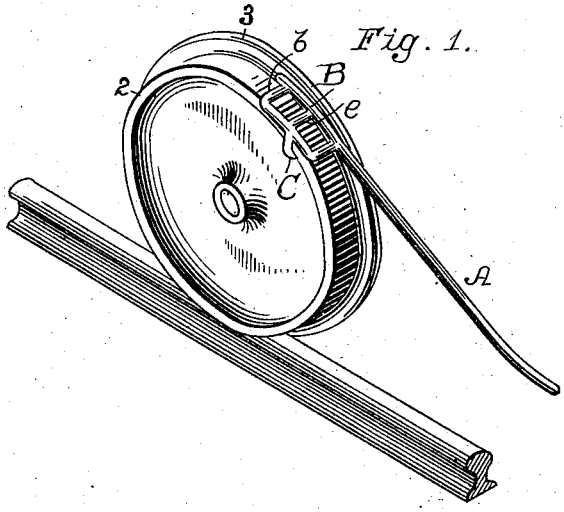
Fig. 1.
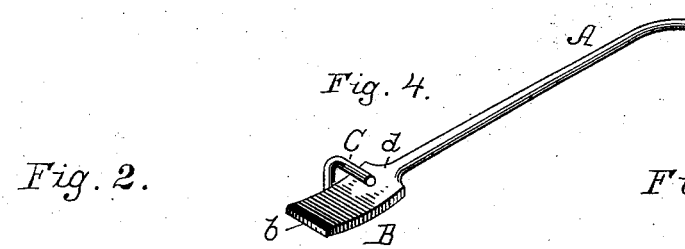
Fig. 4.
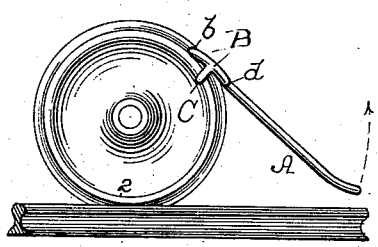
Fig. 2.
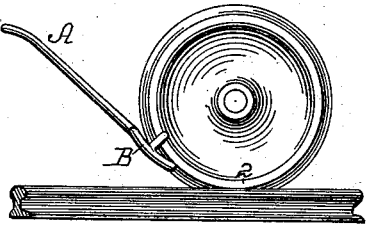
Fig. 3.
Fig. 5.
WITNESSES
F. G. Fischer
A. Mason
INVENTOR
Carter B. Dean
By J. C. Higdon
Attorney.

UNITED STATES PATENT OFFICE.

CARTER B. DEAN, OF NORBORNE, MISSOURI.

CAR-MOVER.

SPECIFICATION forming part of Letters Patent No. 375,443, dated December 27, 1887.

Application filed September 12, 1887. Serial No. 249,414. (No model.)

*To all whom it may concern:*

Be it known that I, CARTER B. DEAN, of Norborne, Carroll county, State of Missouri, have invented certain new and useful Improvements in Car-Movers, of which the following is a full, clear, and exact description, reference being had to the accompanying drawings, forming a part hereof.

This invention relates to instruments for moving cars by hand; and it may be said to consist in a suitable bar or lever having a gripping-face for engaging the tread of the car-wheel, and provided with a hook for engaging the side flanges of the wheel, said hook projecting from one side of said bar and extending transversely across the gripping-face thereof, substantially as hereinafter set forth, and pointed out in the claim.

In the drawings, which illustrate the manner of carrying out my invention, Figure 1 is a perspective view showing the implement applied to a car-wheel. Fig. 2 is a side view showing the implement applied to a car-wheel and in position to move it by an upward movement. Fig. 3 is a similar view showing the implement arranged to move a car-wheel by downward movement. Fig. 4 is a perspective view of the instrument in modified form, and Fig. 5 is a perspective view showing the instrument modified so as to engage the flange side of a wheel.

A indicates a bar or lever of suitable material and having sufficient length to permit all necessary power being applied to the car-wheel to move the car, and having what I may term a "gripping" face or plate, B, formed upon one end, as shown. The gripping face or plate I may manufacture in different forms, either in skeleton form, as indicated in Figs. 1 and 5, and composed of a number of short bars welded together, or I may manufacture it in solid form, as clearly shown in Fig. 4. This gripping-face, it will be observed, is slightly curved, so as to more nearly conform to the tread of the wheel, which it engages when the instrument is in use. A hook or prong, C, is formed integral with or securely attached to the plate or face and projects from one side of said gripping-plate at approximately a right angle thereto and extends transversely across it.

The letter $b$ indicates the extreme end or fulcrum portion of gripping-face B, and letter $e$ represents a cross-bar composing a portion of said gripping-plate when the same is manufactured in skeleton form, as before mentioned.

In operation, when a car is to be moved, the gripping-face B is placed in contact with the tread of the wheel and hook C is made to engage wheel-flange 2, as shown in the figures, when by lifting lever A, or by pushing it down, the car-wheel will be rotated and the car moved along the track in either direction, as may be desired. After one stroke of the lever has been made recovery may be had and a new grip taken by sliding the implement along on the wheel, somewhat similar to the way in which ordinary pinch-bars are used, the end $b$ of the gripping-plate being made to bite the tread of the wheel, or the end $d$ the same, according to the direction in which the car is to be moved.

In some cases I may bifurcate the end $b$ and provide it with a fork, $c$, as indicated more clearly in Fig. 5, so that hook C may engage the opposite side of the wheel from that shown in Fig. 1, said fork during operation of the implement being located astride of flange 3.

Having thus described my invention, what I claim is—

The herein-described implement for moving cars, consisting of the lever A, having the gripping portion B at one end thereof and the hook C projecting from said gripping portion, and thence laterally across the same, so as to bear upon the inner surface of the wheel-flange, substantially as described.

In testimony whereof I affix my signature in presence of two witnesses.

CARTER B. DEAN.

Witnesses:
W. E. NOTTINGHAM,
LEO E. WOODS.